No. 670,164. Patented Mar. 19, 1901.
O. P. SHAVER.
CHANGEABLE SPEED AND REVERSIBLE GEARING.
(Application filed Nov. 24, 1900.)
(No Model.)
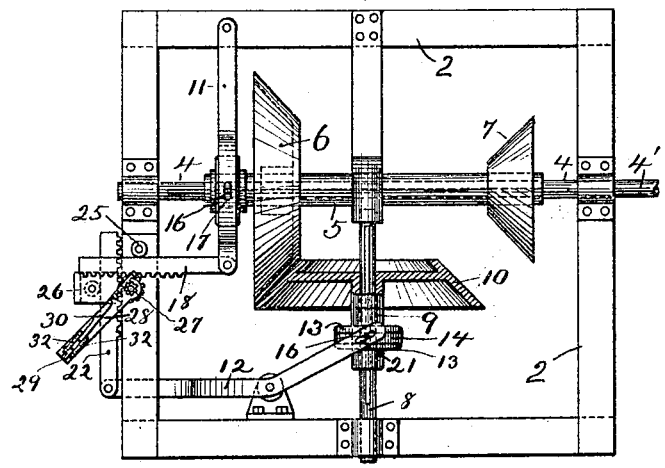
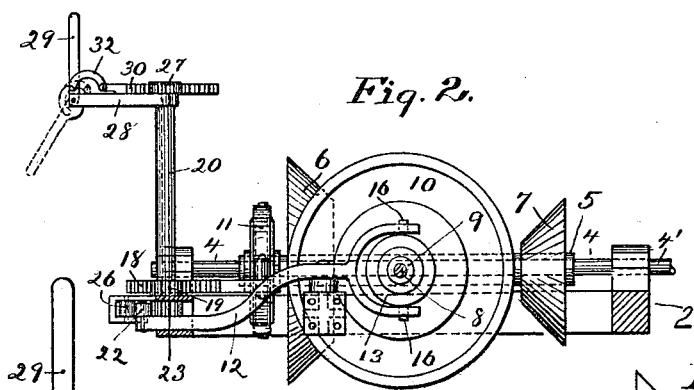
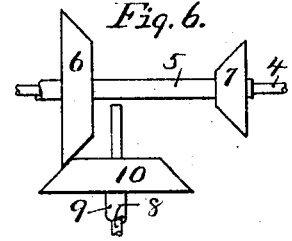
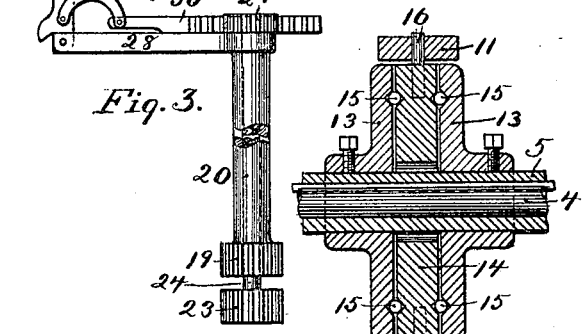
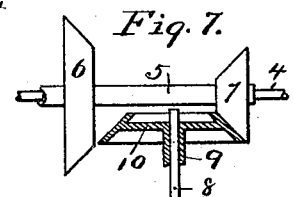
Witnesses:
Inventor:
O. P. Shaver,
By  Attorney.

UNITED STATES PATENT OFFICE.

OLIVER P. SHAVER, OF FRIEDENS, PENNSYLVANIA.

CHANGEABLE-SPEED AND REVERSIBLE GEARING.

SPECIFICATION forming part of Letters Patent No. 670,164, dated March 19, 1901.

Application filed November 24, 1900. Serial No. 37,563. (No model.)

*To all whom it may concern:*

Be it known that I, OLIVER P. SHAVER, a citizen of the United States, residing at Friedens, in the county of Somerset and State of Pennsylvania, have invented new and useful Improvements in Changeable-Speed and Reversible Gearing, of which the following is a specification.

This invention relates to changeable-speed and reversible gearing, and has particular reference to certain improvements in the gearing patented to John W. Shaver and myself December 18, 1900, No. 663,940. In that patent, as in this application, both the drive and driven gears must be adjusted when changing the speed and also when reversing the motion; and the primary object of the present improvement is to provide actuating mechanism common to both gears whereby their adjustment may be accomplished by a single operation. In the said prior application separate adjusting mechanisms are shown, thus necessitating two distinct operations for each adjustment.

The invention consists in the novel features of construction and in the combination and arrangement of parts hereinafter fully described and claimed and illustrated by the accompanying drawings, wherein—

Figure 1 is a plan view, partly in section, of mechanism embodying my invention. Fig. 2 is a side elevation of the same. Fig. 3 is an elevation in detail of a portion of the gear-adjusting mechanism, and Fig. 4 is a plan view of the same. Fig. 5 is a sectional view, on an enlarged scale, of the connection between the adjusting-levers and gear-carrying sleeves. Figs. 6 and 7 are diagrammatic views of the gears in different positions of adjustment.

The gearing herein shown and described is designed, primarily, for use on automobiles, road-engines, and other traction-vehicles, though not necessarily limited thereto, and for the purpose of illustrating the invention an angular frame 2 is shown, within and upon which the improved mechanism is mounted. Journaled transversely in the frame is drive-shaft 4, which extends at 4' from the motor (not shown,) and splined on the shaft is sleeve 5, carrying the main driving beveled friction-gear 6 and reversing-gear 7.

The driven shaft 8 is journaled in frame 2 at right angles to drive-shaft 4, and splined thereon is sleeve 9, carrying gear 10, preferably of the same diameter as gear 6. For shifting the gears on the drive and driven shafts levers 11 and 12 are provided, which are suitably fulcrumed in frame 2 and provided, respectively, with antifriction connections with sleeves 5 and 9. These connecting devices are identical, so one only is shown in detail, that of sleeve 5 and lever 11. Each of said connections consists of separated disks 13, secured to the gear-carrying sleeve on opposite sides of the non-rotatable ring 14, with raceways formed in adjacent faces of the disks and ring to receive balls 15, thus forming an antifriction connection. Pins 16 project from opposite sides of ring 14 to receive the lever.

For the driving-gears lever 11 is formed to embrace ring 14, being slotted at 17 to receive pins 16, and hinged to the free extremity of this lever is rack 18, which meshes with pinion 19 on the lower extremity of tubular shaft 20. Lever 12 is fulcrumed between its ends, as shown, and formed at one end to embrace ring 14 of driven gear-sleeve 9, being slotted at 21 to engage pins 16. Hinged to the opposite extremity of lever 12 is rack 22, which meshes with pinion 23, secured to the lower extremity of shaft 24. The said racks are held in engagement with the respective pinions by roller-guides 25 and 26 on frame 2.

Shaft 24 extends through shaft 20 and carries at its upper end pinion 27, while projecting laterally from the corresponding extremity of shaft 20 is crank-arm 28, and mounted on the extremity of the latter is the combined lever-handle 29. 30 is a rack-bar slidable on arm 28, which is held in engagement with pinion 27 by stop 31. The outer extremity of this rack-bar is connected to lever 29 by curved links 32. With lever-handle 29 maintained in any given position, so as to prevent rack-bar 30 from moving longitudinally, shafts 20 and 24 are rigidly united, and by turning the former through the medium of the crank-arm 28 and lever-handle 29 rack-bars 18 and 22 are moved corresponding distances, thus imparting relative movements to gears 6 and 10, adjustment in one direction serving to increase and in the other to diminish the speed.

For high speed the gears are positioned as in diagram Fig. 6, while for reversing the motion the driven gear 10 is moved past the position of engagement with gear 6 productive of the slowest speed, when it engages the reversing drive-gear 7. The latter is here shown of comparatively small diameter, as in the operation of traction-vehicles it is not desired to move them backward at high speed. For other uses, however, a larger gear may be provided. The normal position of lever-handle 29 is as shown in dotted lines in Fig. 2, as in turning to this position slight longitudinal movement is imparted to rack-bar 30, the extent of which is just sufficient to move shaft 24 slightly independently of shaft 20, and thus cause the gears to impinge each other with considerable tension. With lever-handle 29 in upright position, as shown in full lines, this tension is relaxed, and comparatively little effort on the part of the operator is required to turn the shafts so as to increase or diminish the speed or reverse the motion.

It will be understood that in practice the relative positions of the gears and actuating mechanism may be changed as circumstances may require; also, that the construction of the same may be modified without departing from the spirit and scope of the invention.

Having thus fully described my invention, what I claim as new, and desire to secure by Letters Patent, is—

1. The combination of bevel driving and driven gears, and means operating interchangeably for adjusting said gears in unison or one of said gears alone, substantially as shown and described.

2. The combination of bevel driving and driven gears, two shafts operatively connected, respectively, to said gears, and means operating interchangeably for actuating said shafts in unison or one of said shafts alone, substantially as shown and described.

3. The combination of bevel driving or driven gears, two adjusting-shafts, a pinion on each shaft, two rack-bars engaging, respectively, said pinions, operative connections between the rack-bars and gears, and means operating interchangeably for actuating said shafts in unison or one of the shafts alone, substantially as shown and described.

4. The combination of bevel driving and driven gears, two shafts operatively connected, respectively, to said gears, one of said shafts being tubular in form and inclosing the other shaft, a crank-arm on the tubular shaft, a pinion on the inner shaft, a rack-bar slidable on the crank-arm and engaging said pinion, and means for adjusting the rack-bar and for maintaining the adjustment, substantially as shown and described.

5. The combination of bevel driving and driven gears, two shafts operatively connected, respectively, to said gears, one of the shafts being tubular in form and inclosing the other shaft, a crank-arm on the tubular shaft, a pinion on the inner shaft, a rack-bar slidable on the crank-arm and engaging said pinion, a combination lever-handle fulcrumed to the crank-arm, and a link connecting the same with the said rack-bar, substantially as shown and described.

In testimony whereof I have hereunto set my hand in presence of two subscribing witnesses.

OLIVER P. SHAVER.

Witnesses:
WM. W. BAKER,
SAMUEL P. SNYDER.